Patented Feb. 9, 1932

1,844,718

UNITED STATES PATENT OFFICE

CYRIL J. STAUD AND JAMES T. FUESS, OF ROCHESTER, NEW YORK, ASSIGNORS TO EASTMAN KODAK COMPANY, OF ROCHESTER, NEW YORK, A CORPORATION OF NEW YORK

PROCESS FOR THE MANUFACTURE OF CELLULOSE ACETATE

No Drawing. Application filed February 23, 1929. Serial No. 342,293.

This invention relates to cellulose acetate and particularly to an economical method of preparing cellulose acetate.

Cellulose acetate is prepared by subjecting cellulose material to the action of acetic anhydride in the presence of a catalyst and acetic acid. This procedure is relatively slow and correspondingly expensive.

It is the object of the present invention to improve the method by preliminarily treating the cellulose to facilitate the acetylation thereof and improve thereby the resulting cellulose acetate.

We have found that the acetylation of cellulose is accomplished more advantageously if the cellulose material be subjected preliminarily to the action of a perborate and particularly to a perborate of an alkali metal, such as sodium. A simultaneous pretreatment and bleaching of the cellulose results whereby the subsequent acetylation is accelerated and the ultimate appearance of the final product is improved. Consequently, a saving in time and expense of operation is effected.

We have found it desirable also to employ, in connection with the perborate, a small proportion of an acid such as boric, citric or tartaric acid. The acids mentioned tend to increase the solubility of the perborate in acetic acid which is employed in the solution.

In carrying out the invention we provide a solution of sodium perborate, for example, in water, and add thereto a small proportion of boric, citric, or tartaric acid. This solution is added to glacial acetic acid. The cellulose material is immersed in the latter solution and remains therein at a relatively low temperature for a period sufficient to accomplish the desired modification. As an example of the procedure, a solution of 3 to 7 grams of sodium perborate in 100 cc. of water is prepared, and 2 grams of boric, citric or tartaric acid is added thereto. Thirty cc. of this solution is added to 270 cc. of glacial acetic acid and 50 grams of cotton linters is immersed therein. The solution is maintained at a temperature from 20° to 30° C. for a period of 16 hours.

The perborate solution containing either citric, or tartaric acid must be used promptly. Solutions containing boric acid may be preserved for several days.

The cellulose material after pretreatment in the manner described is in condition for acetylation, which is accomplished by the addition of a suitable proportion of acetic anhydride and of a catalyst which may comprise a mixture of phosphoric acid and sulphuric acid.

In the preferred form of the invention, the acetylation is brought about by adding enough acetic anhydride, together with the catalyst to acetylate the material. The reaction proceeds until the pretreated cellulose material is converted into chloroform soluble cellulose acetate. This acetylation is conducted preferably at 35° to 60° C.

It is preferable also to cool the pretreated mass before the acetic anhydride is introduced, so that the heat evolved during the addition will not increase materially the temperature of the reaction mass. The acetic anhydride may be added rapidly or slowly at intervals. We prefer to add it so that each part of the cellulose material will receive its proportion of the anhydride at about the same time.

As a specific example of the procedure, 50 parts by weight of cellulose material, such as cotton linters which have been purified for example by boiling in dilute caustic soda followed by a short bleach, are immersed with 315 parts of acetic acid solution containing 2 parts of sodium perborate and .66 parts of boric, citric, or tartaric acid and 30 parts of water. After the preliminary treatment, as hereinbefore described, we add to the mass 150 to 170 parts by weight of acetic anhydride (85% strength). This corresponds to 127 to 144 parts by weight of the actual anhydride. In this acetic anhydride has been dissolved 4½ parts by weight of mixed catalyst. This catalyst is composed of 2.6 parts by weight of phosphoric acid (95% strength) and .9 of sulphuric acid (98% strength). The addition of the anhydride causes the reaction mass to increase in temperature, and the addition is conducted so that the mass finally reaches a temperature of about 42° C. The reaction is permitted to continue at approximately the temperature mentioned, with suitable agitation or mixing as required, until the fibers disappear and a clear reaction solution or "dope" is obtained. At the completion of the reaction, the acetate should be soluble in chloroform. The chloroform soluble cellulose acetate may be hydrolyzed to the acetone soluble form in any of the known ways, for example by adding a mixture of water, mineral acid and acetic acid to the reaction mass and allowing the hydrolysis to proceed at the appropriate temperature.

Chloroform soluble cellulose acetate or the hydrolyzed acetate may be separated from the reaction mixture by precipitating in water or by spray drying. The separated cellulose acetate may then be washed and dried. After the chloroform soluble cellulose acetate is thus separated and recovered, it may be hydrolyzed subsequently in any appropriate manner, as is well known in the art.

The procedure as described is adapted to effect a desirable and economical conversion of cellulose material into cellulose acetate. The method reduces the time required to effect the conversion and results moreover in a well bleached cellulose acetate.

Various changes may be made in the details of the operation or in the proportions of the constituents employed in the reaction without departing from the invention or sacrificing any of its advantages.

Having thus described our invention, what we claim as new and desire to secure by Letters Patent is:

1. The process of making cellulose acetate which comprises pretreating the cellulose with an aqueous solution of a perborate in glacial acetic acid, adding acetic anhydride and a mixed catalyst containing sulphuric and phosphoric acids and continuing the reaction to complete the acetylation of the cellulose.

2. The process of preparing cellulose acetate which comprises pretreating the cellulose with an aqueous solution of sodium perborate in glacial acetic acid, adding acetic anhydride and a mixed catalyst containing sulphuric and phosphoric acids and continuing the reaction to complete the acetylation of the cellulose.

3. The process of preparing cellulose acetate which comprises pretreating the cellulose with an aqueous solution of sodium perborate in glacial acetic acid with a small proportion of one of the members of the group consisting of boric, citric, and tartaric acid, adding acetic anhydride and a mixed catalyst containing sulphuric and phosphoric acids, and continuing the reaction to complete the acetylation of the cellulose.

4. The process of preparing cellulose acetate which comprises pretreating the cellulose with an aqueous solution of a perborate and glacial acetic acid at a temperature of from 20° to 30° C. adding acetic anhydride and a mixed catalyst containing sulphuric and phosphoric acids and continuing the reaction to complete the acetylation of the cellulose.

5. The process of preparing cellulose acetate which comprises pretreating the cellulose with an aqueous solution of a perborate and glacial acetic acid for a period of approximately sixteen hours, adding acetic anhydride and a mixed catalyst containing sulphuric and phosphoric acids and continuing the reaction to complete the acetylation of the cellulose.

6. The process of simultaneous bleaching and acetylation of cellulose acetate which comprises pretreating the cellulose with a solution of acetic acid to which has been added a perborate dissolved in water, adding acetic anhydride and a mixed catalyst containing sulphuric and phosphoric acids and continuing the reaction to complete the acetylation of the cellulose.

Signed at Rochester, New York, this 16th day of February, 1929.

CYRIL J. STAUD.
JAMES T. FUESS.